March 23, 1943.  V. H. PAVLECKA  2,314,628
ELECTRIC ARC WELDING TORCH
Filed Oct. 6, 1941
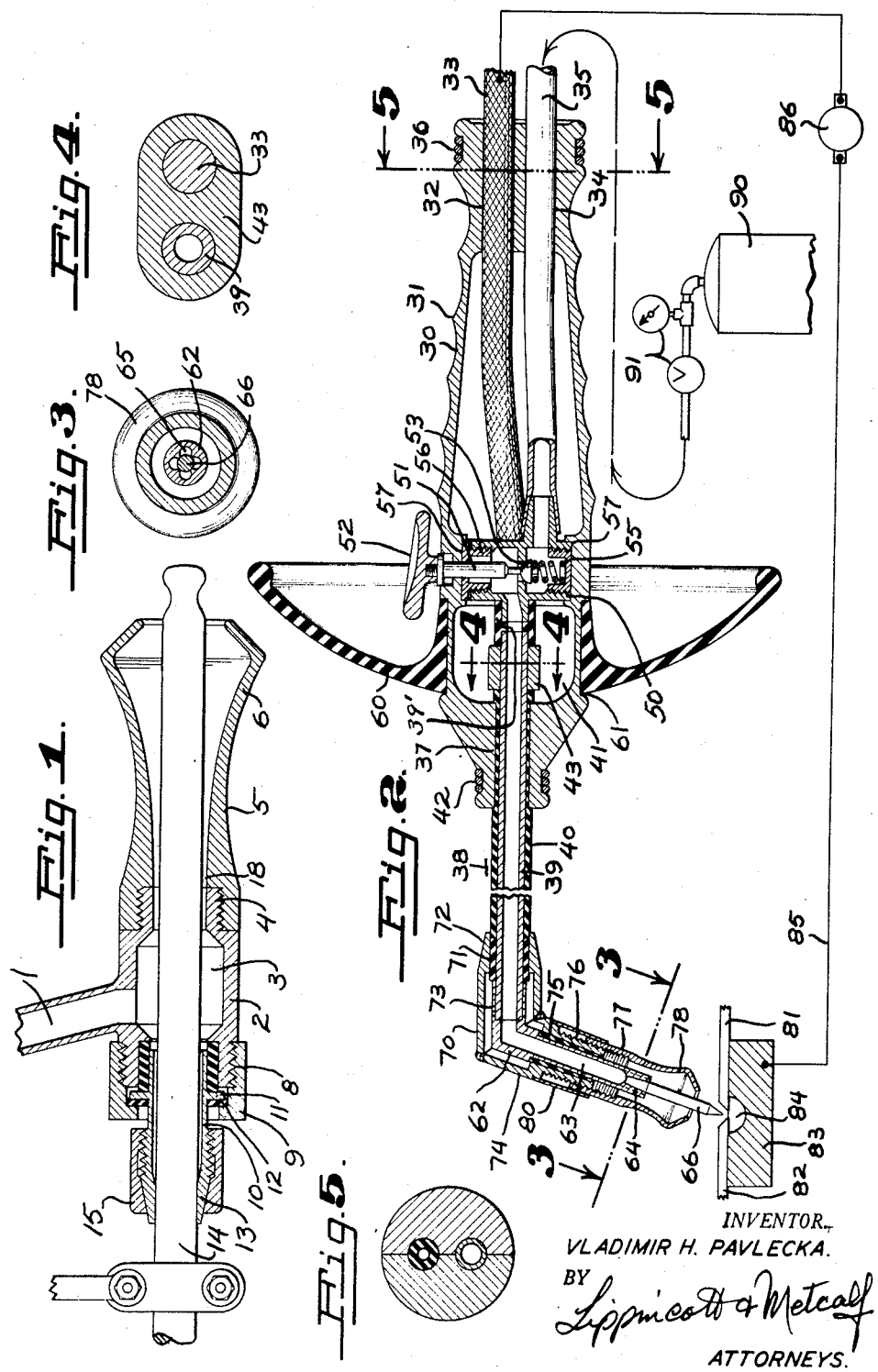
INVENTOR.
VLADIMIR H. PAVLECKA.
BY Lippincott & Metcalf
ATTORNEYS.

Patented Mar. 23, 1943

2,314,628

UNITED STATES PATENT OFFICE 2,314,628

ELECTRIC ARC WELDING TORCH

Vladimir H. Pavlecka, Pacific Palisades, Calif., assignor to Northrop Aircraft, Inc., Hawthorne, Calif., a corporation of California Application October 6, 1941, Serial No. 413,780

13 Claims. (Cl. 219—15)

My invention relates to electric arc welding torches and more particularly to a welding torch adapted for use in welding low melting point materials, such as aluminum and magnesium or the alloys thereof, in conjunction with a helium gas arc blanket. This invention embodies improvements on the arc welding torch, shown, described and claimed in the co-pending Meredith application Serial No. 373,157, filed January 4, 1941, entitled Welding torch and since matured into Patent No. 2,274,631, dated February 24, 1942.

In the application just above cited it has been pointed out that electric arc welding using a refractory rod for one electrode, and the work for the other electrode, can be very satisfactorily carried out in conjunction with the welding of aluminum and magnesium sheets, when a flow of helium gas at low pressure is directed over the arc zone, and when precautions are taken to prevent atmospheric air from entering the helium blanket.

Meredith prevents atmospheric air from being drawn into the arc by supplying the gas through a tube out of which the refractory electrode concentrically projects, and flaring the end of this tube to divert air drawn down the outside of the tube away from the arc zone. This torch has been found to be very successful in arc welding magnesium sheet.

The present application provides a torch embodying additional features to control the proper flow of helium gas around the arc during the operation, provides a torch in which a minimum of refractory electrode is wasted, and provides a simple and efficient arc welding torch construction including means for directing helium gas or the like to the arc zone without substantial turbulence.

Other objects of my invention will be apparent or will be specifically pointed out in the description forming a part of this specification, but I do not limit myself to the embodiment of the invention herein described, as various forms may be adopted within the scope of the claims.

In the drawing:

Fig. 1 is a sectional view of an arc welding torch utilizing the general construction of the Meredith torch above referred to, together with an expansion chamber for reducing turbulence in the gas delivered to the arc zone.

Fig. 2 is a longitudinal sectional view of a complete torch embodying turbulence control in the supplying of gas to the arc zone, and a means for reducing waste in the use of refractory electrode material.

Fig. 3 is a sectional view taken as indicated by the line 3—3 in Fig. 2.

Fig. 4 is a sectional view taken as indicated by the line 4—4 of Fig. 2.

Fig. 5 is a sectional view of the handle taken as indicated by line 5—5 in Fig. 2.

In the Meredith application cited above a torch having an end portion similar in general construction to that shown in Fig. 1, is utilized to weld aluminum, magnesium or alloys thereof in sheet or solid form by applying current through a refractory electrode, such as a tungsten rod, to the weld area, striking an arc, and feeding filler material into the arc while flowing helium gas at a low pressure at, for example, .36 pound per square inch. The gas is supplied axially around the tungsten electrode, into the arc zone and around the weld material. In this manner a simple structure can be used for welding and blanketing an arc with gas during welding, oxidation of the weld is prevented, and danger of igniting the materials having relatively low melting and ignition points is removed.

In Fig. 1 I have shown a sectional view of the tip portion of a Meredith type torch with an additional construction embodied therein to prevent turbulence of the gas supplied to the arc zone, and I will first describe this embodiment of my invention.

In this case a helium conduit 1 is provided, attached to a tip-body 2. Helium conduit 1 may be utilized as a handle for manipulating the torch if desired. Tip-body 2 is provided with an expansion chamber 3 axially formed therein, and a threaded end 4 to which is attached a nozzle 5 terminating in a flared end 6. The other end of tip-body 2 is provided with threads 8 to which a retaining cap 9 is screwed, this retaining cap 9 positioning and fastening a bushing 10 to body 2 by forcing shoulder 11 on the bushing against the end of the body by means of a washer 12. Bushing 10 is provided with a split tapered end 13 which can be tightened against a tungsten electrode rod 14 by the use of a wedge nut 15. The tungsten electrode 14 is positioned to extend axially through expansion chamber 3 and beyond flared end 6 in such a manner that a narrow annular duct 18 is provided between expansion chamber 3 and flared end 6. The arc is maintained between the end of tungsten electrode 14 projecting from flared end 6 and the work, and helium at a relatively low pressure, say of .36 or less pound per square inch, is flowed through helium duct 1, into expansion chamber 3, from which it flows strictly axially and without turbulence around the electrode 14 to the arc zone. The expansion chamber 3 in the torch rectifies the flow, distributes the helium uniformly around the electrode 14 and completely eliminates irregular flow which can occur when no expansion chamber 3 is utilized in the helium line. The narrow peripheral space around the tungsten electrode confines the helium to a strictly axial flow which is not substantially disturbed in passing through the flared end 6, so that the gas reaches the arc zone substantially uncontaminated by atmospheric air and substantially as a tubular uniform flow.

In the type of torch just above described, there is some loss of tungsten during the welding process and therefore the tungsten rod 14 occasionally is fed through the tip so that it projects the proper amount from the flared end, by loosening nut 15 thus freeing the rod, moving the rod toward the flared end and then locking the rod in place again by screwing nut 15 against tapered end 13.

However, it will be obvious that once the outer end of the tungsten rod 14 has reached the tapered end 13 the rod can no longer be fed through the device. The tungsten rod then must be discarded and a longer rod substituted. This results in the loss of a considerable length of tungsten rod.

I have therefore provided a modified construction wherein the tungsten rod can be used to a much greater extent. Such a torch is shown in complete detail in Figs. 2, 3 and 4. This torch also embodies the axial flow principle described in conjunction with Fig. 1.

In this case the torch is provided with a hollow handle 30 having exterior ridges 31 to aid hand grasp, and for raising the hand away from perfect contact with the handle, to avoid sweating. The handle is split longitudinally. One end thereof is provided with one half of channel 32 for the passage of a power wire 33, and with one half of parallel channel 34 for the passage of a helium tube 35. The handle halves are held together at this end of the handle by a spring ring 36 surrounding both halves.

The other end of the handle is provided with an axial channel 37 for the reception of a composite hollow stem 38. This stem 38 comprises an inner metallic tube 39 and an outer insulating tube 40. The composite stem extends through channel 37 into a connection chamber 41 in the interior of the handle. At the stem end of the handle, the handle halves are locked together by second spring ring 42.

Within chamber 41 the external insulating tube 40 terminates so that an electrical connection clamp 43 may be attached to the inner metallic tube 39. This clamp is in turn attached to the end of electrical power wire 33, as shown in Fig. 4.

The inner end of metallic tube 39 is attached through an insulating sleeve 39' to a thumb valve body 50 having therein a plunger 51 operated from outside the handle by a thumb button 52. Valve 53 controls the flow of gas from helium tube 35 into the metallic portion 39 of stem 38, helium tube 35 being connected to the inlet of valve body 50. Thumb valve 52 is normally maintained closed by spring 55. Plunger 51 operates through the usual stuffing box 56. Thumb valve body 50 is held in place within the handle by having its ends register with recesses 57 in opposite halves of the handle.

The handle is provided with a soft rubber shield 60 curved backwards over part of thumb button 52, this shield being sprung into annular shield recess 61 cut in the two halves of the handle. Thus the rubber shield 60 also serves to hold the handle parts together. Shield 60 is preferably of soft rubber, extends sufficiently laterally to protect the hand of the operator from the ultra-violet rays and heat emitted by the arc, and is sufficiently resilient so that if it contacts the work the shield will give without damaging the work.

Composite stem 38 is extended outwardly from handle 30 a distance to place the operating end of the torch in proper position to be seen and moved by the operator of the torch, and terminates in an electrode end, which will next be described.

Brazed to the end of the metal tube portion 39 of stem 38 is an inner metal tip portion 62 extending forward and then downwardly with relation to the position of thumb button 52. This tip portion 62 is provided with an interior bore 63 registering with and of substantially the same diameter as the interior of the metal tube 39 to which it is brazed. The end of tip 62 is provided with an axial tapered bore 64 surrounded by lateral parallel bores 65 as shown in Fig. 5. The central bore 63 receives, with a press fit, a relatively short tungsten electrode 66.

Thus it can be seen that gas may flow from helium tube 35, through valve 50 through the interior of metal tube 39, through the bore 63 of tip 62 and through lateral bores 65 to emerge in axial flow around the short electrode 66. It can also be seen that electric current will be conducted through power wire 33, through connection 43 into tube 39 and thence from tube 39 and tip 62 into electrode 66. Thus tube 39 not only carries the helium flow, but also carries the welding current.

On the handle side of the welder between tip 62 and metal tube 39, an exterior sleeve 70 is press-fitted over composite steam 38, with the insulating tubing 40 terminating just under the handle end 72 of this fitting. The remainder of the end 72 of fitting 70 is insulated from tube 39 by a mica sleeve 71, held in place by the end portion 73 of tip 62. A tip sleeve 74 is then angularly welded to fitting 70 positioned around and concentric with metal tip 62. Tip sleeve 74 is slipped over a tip insulating mica sleeve 75 before the weld is made. Thus the inner and outer tip portions are insulated from each other and are held in exact alinement through the use of tip insulating sleeve 75.

Tip sleeve 74 at its lower end is provided with threads 76 to which is screwed a nozzle 77 terminating in a flared end 78 similar in contour and function to flared end 6 in Fig. 1, and to the flared end used in the Meredith torch. Fastened to tip sleeve 74 is a circumferential split sleeve 80, the split portions extending downwardly over threads 76 and over the engaged end of nozzle 77. This split sleeve 80 is split longitudinally so that the tongues thereof will apply pressure to the engaged end of nozzle 77 so that as the nozzle is screwed on threads 76, the nozzle will stay in position as left, without danger of being accidently displaced.

This completes the description of the mechanical features of the torch, and I will next describe its operation.

In Fig. 2, I have shown diagrammatically, two work sheets 81 and 82 positioned with scarfed edges adjacent and backed by a copper backing plate 83 having a weld channel 84 cut therein following the extent of the weld to be made. The work sheets 81 and 82 and copper backing plate 84 are connected through return power line 85 to a generator of electrical power 86, the other connection of which is made to power wire 33 entering handle 30. A fresh tungsten electrode 66 is then inserted in bore 64 and the nozzle 77 is screwed outwardly until the flared end 78 is in proper relationship to the outer end of electrode 66 to direct the helium therearound. Helium gas is supplied to helium pipe 35 from a helium tank 90 provided with the usual valves and pressure gauge assembly 91 and the device is ready for operation.

The handle is grasped by the operator and helium at a low pressure, on the order of .36 pound per square inch, for example, is released into metal pipe 39 by pressure on thumb button 52. As soon as helium is flowing properly the end of electrode 66 is touched to the work, the arc established and the weld made by feeding material to the weld from a filler rod not shown. This filler rod may be of the same material as sheets 81 and 82 such as, for example, magnesium, aluminum or alloys thereof, or any other metal alloys, e. g., "Inconel," stainless steel, brasses, copper alloys, etc., with which very excellent welds have been obtained by this method.

Helium gas is relatively expensive and even if used at the low pressures as recited, conservation is valuable. Thumb valve 50 therefore need only be used to admit helium to the tip when actually needed for the welding. At all other times the valve may remain closed.

As the helium is being applied to the arc the interior of the metal tube 39 and the tip bore 63 acts in the same manner as expansion chamber 3 in the device shown in Fig. 1. The flow of helium emerges in strictly axial flow from bores 65, and the gas flows from these bores without turbulence along the electrode 66 to the arc. Irregular flow is eliminated as in the device of Fig. 1, and the helium is uniformly distributed around the electrode, the arc and the weld without substantial inclusion of atmospheric air.

It will be noted that in the construction just described, the electrode 66 is relatively short. Inasmuch as this electrode gradually absorbs gas at high temperature during use, and thereby becomes brittle, it periodically breaks off at the tip due to mechanical shocks, e. g., dropping the torch on a work-bench. The distance between the end of the electrode 66 and flared end 78 will therefore gradually become shorter. When this distance becomes too short for proper operation of the torch, nozzle 77 may be screwed inwardly on tip sleeve 74 so that the proper length of electrode 66 may again project beyond flared end 78. This procedure can be continued until nozzle 77 is retracted as far as possible on tip sleeve 74. At this time the end of electrode 66 will be very close to the end of tip portion 60, and the small remainder of electrode 66 may be removed from the tip portion 60, discarded, and a new electrode inserted.

Thus I have provided in the torch shown in Figs. 2 to 4, inclusive, a helium arc welding torch, in which there is very small loss of the refractory electrode material and yet which will have at the same time all of the desirable characteristics of the Meredith torch, and of the torch shown in Fig. 1.

I claim:

1. An electric arc welding torch including a refractory electrode rod, a tube concentrically positioned around said rod and having a flared metal end beyond which said rod projects, the interior of said tube being constricted directly around said rod as said rod enters said flared end then expanded, and again constricted around said rod as said rod leaves said flared end to form an expansion chamber in said end, and means for supplying an arc blanket gas to said tube above said constriction, whereby said gas will flow through the expansion chamber in said flared end and around the projecting end of said rod substantially without turbulence.

2. Apparatus in accordance with claim 1 wherein said tube and said rod are insulated from each other.

3. Apparatus in accordance with claim 1 wherein the interior of said tube is expanded immediately prior to the first recited constriction thereof to form another expansion chamber first traversed by said gas.

4. Apparatus in accordance with claim 1 wherein the cross section at said first recited constriction is annular.

5. Apparatus in accordance with claim 1 wherein the cross section at said first recited constriction is constricted by dividing said conduit into a plurality of openings circumferentially positioned around said electrode.

6. An arc welding torch comprising an electrically conductive gas conduit, an electrode axially inserted in the end face of said conduit, said conduit having a plurality of separate bores in said end face circumferentially surrounding said electrode at the insertion thereof, and directed axially along the periphery of said electrode, means for electrically connecting said conduit to a source of electrical power suitable for arc welding, means for supplying an arc blanketing gas to the interior of said conduit, and an air shield mounted concentrically around said conduit to form an expansion chamber surrounding said end face, and a portion of said electrode, said chamber terminating in a constricted annular opening around said electrode with the end of said electrode projecting beyond said opening.

7. An arc welding torch comprising an electrically conductive gas conduit, an electrode axially inserted in the end of said conduit, the interior walls of said conduit having a plurality of axially directed channels therein separated by the insertion of said electrode, said channels forming the end outlet from the interior of said conduit, means for electrically connecting said conduit to a source of electrical power suitable for arc welding, and means for supplying an arc blanketing gas to the interior of said conduit.

8. An arc welding torch comprising an electrically conducting gas conduit, an electrode axially inserted in the end face of said conduit, said conduit having a plurality of separate bores in said end face circumferentially surrounding said electrode at the insertion thereof, and directed axially along the periphery of said electrode, means for electrically connecting said conduit to a source of electrical power suitable for arc welding, means for supplying an arc blanketing gas to the interior of said conduit, and an outwardly flaring air shield mounted concentrically with respect to said conduit and projecting beyond said end face, the interior of said shield being expanded adjacent said end face and terminating in a constricted annular opening through which the end of said electrode projects.

9. An arc welding torch comprising an electrically conductive gas conduit, an electrode axially inserted in the end of said conduit, said conduit having a plurality of bores in said end circumferentially surrounding said electrode at the insertion thereof and directed axially along the periphery of said electrode, means for electrically connecting said tube to a source of electrical power suitable for arc welding, and an outwardly flaring air shield mounted concentrically with respect to said tube adjacent the end thereof with said electrode projecting beyond the open end thereof, said shield being axially movable with respect to said tube to compensate for changes in electrode length.

10. An arc welding torch comprising an electrically conductive gas conduit, an electrode axially inserted in the end of said conduit, said conduit having a plurality of bores in said end circumferentially surrounding said electrode at the insertion thereof and directed axially along the periphery of said electrode, means for electrically connecting said tube to a source of electrical power suitable for arc welding, and an outwardly flaring air shield mounted concentrically with respect to said tube adjacent the end thereof with said electrode projecting beyond the open end thereof, said shield being mounted on threads attached to said tube for differential axial placement thereof with respect to the end of said electrode.

11. An arc welding torch comprising an electrically conductive gas conduit, an electrode axially inserted in the end of said conduit, said conduit having a plurality of bores in said end circumferentially surrounding said electrode at the insertion thereof and directed axially along the periphery of said electrode, means for electrically connecting said tube to a source of electrical power suitable for arc welding, and an outwardly flaring air shield mounted concentrically with respect to said tube adjacent the end thereof with said electrode projecting beyond the open end thereof, said shield being insulated from said tube.

12. Apparatus in accordance with claim 9 wherein said tube is angularly extended to enter a handle, and a thumb operated valve is positioned in said handle and connected to said tube and gas supply to control said gas and wherein said electrical power connection is made to said tube inside of said handle prior to the connection of said tube to said valve.

13. Apparatus in accordance with claim 9 wherein said tube is angularly extended to enter a handle, and a thumb operated valve is positioned in said handle and connected to said tube and gas supply to control said gas and wherein said electrical power connection is made to said tube inside of said handle prior to the connection of said tube to said valve and wherein said shield is insulated from said tube and wherein means are provided to insulate the tube between said handle and said shield from ground.

VLADIMIR H. PAVLECKA.